United States Patent [19]
Liu

[11] Patent Number: 6,079,306
[45] Date of Patent: Jun. 27, 2000

[54] CUTTING-OFF MACHINE FOR A VENETIAN BLIND

[76] Inventor: Tai-Ping Liu, No. 15, Alley 8, Lane 3, Kuochi St., Lungching Hsiang, Taichung Hsien, Taiwan

[21] Appl. No.: 09/092,695

[22] Filed: Jun. 5, 1998

[51] Int. Cl.$^7$ .............................. B23D 23/00; B26D 7/02
[52] U.S. Cl. ................................. 83/454; 83/167; 83/468; 83/468.7; 83/522.19; 83/639.1
[58] Field of Search ............................. 83/167, 157, 196, 83/197, 198, 454, 455, 456, 464, 468, 468.2, 468.4, 522.19, 613, 620, 633, 639.1, 685, 694, 953, 468.7; 29/24.5

[56] References Cited

U.S. PATENT DOCUMENTS

| | | | |
|---|---|---|---|
| 3,735,656 | 5/1973 | Strandell et al. | 83/198 |
| 4,993,131 | 2/1991 | Graves et al. | 29/24.5 |
| 5,337,641 | 8/1994 | Duginske | 83/468 |
| 5,339,716 | 8/1994 | Sands et al. | 83/452 |
| 5,456,149 | 10/1995 | Elsenheimer et al. | 83/564 |
| 5,791,222 | 8/1998 | Micouleau | 83/375 |
| 5,799,557 | 9/1998 | Wang | 83/639.5 |
| 5,806,394 | 9/1998 | Marocco | 83/197 |
| 5,816,126 | 10/1998 | Pluber | 83/167 |
| 5,927,172 | 7/1999 | Wang | 83/454 |

Primary Examiner—Rinaldi I. Rada
Assistant Examiner—Boyer Ashley
Attorney, Agent, or Firm—Kolisch Hartwell Dickinson McCormack & Heuser

[57] ABSTRACT

A cutting-off machine includes a fastening device including a headrail positioning base fixedly mounted on a top wall of a working table and containing a first guiding groove for passage of a headrail, a slat positioning base fixedly mounted on the top wall of the working table and containing a guiding opening for passage of a plurality of juxtaposed slats, and a bottom rail positioning base adjustably fixed on the top wall of the working table and containing a second guiding groove for passage of a bottom rail. An elongate cutting blade is slidably mounted on the fastening device and includes a first end face slidably mounted on the headrail positioning base and containing a first slot for passage of the headrail and formed with a first cutting edge abutting the headrail, and includes a second end face slidably mounted on the slat positioning base and the bottom rail positioning base and containing a second slot for passage of the slats and the bottom rail and formed with a second cutting edge abutting one of the slats. A control device is mounted on the second side of the top wall of the working table and is connected with the cutting blade for moving the cutting blade.

9 Claims, 8 Drawing Sheets

FIG. 7
PRIOR ART ively fixed on the first side of the top wall of the working table and comprises a headrail positioning base fixedly mounted on the first side of the top wall of the working table and containing a first guiding groove adapted for passage of the headrail, a slat positioning base fixedly mounted on the first side of the top wall of the working table and containing a guiding opening adapted for passage of the plurality of juxtaposed slats, and a bottom rail positioning base adjustably fixed on the first side of the top wall of the working table and containing a second guiding groove adapted for passage of the bottom rail.

CUTTING-OFF MACHINE FOR A VENETIAN BLIND

FIELD OF THE INVENTION

The present invention relates to a cutting-off machine, and more particularly to a cutting-off machine for a Venetian blind.

BACKGROUND OF THE INVENTION

Figure 7:
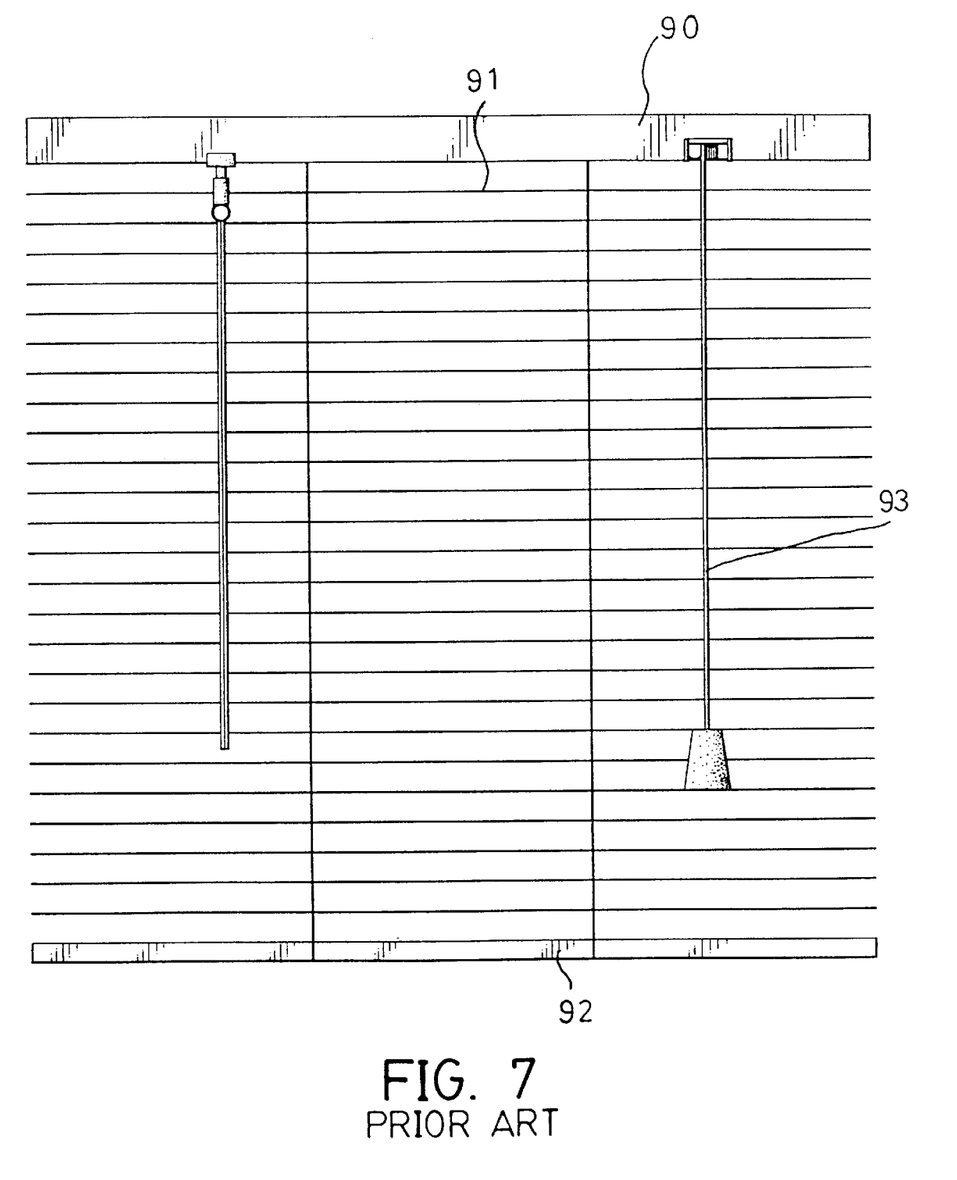
FIG. 7 is a front plan view of a Venetian blind in accordance with the prior art.
Figure 8:
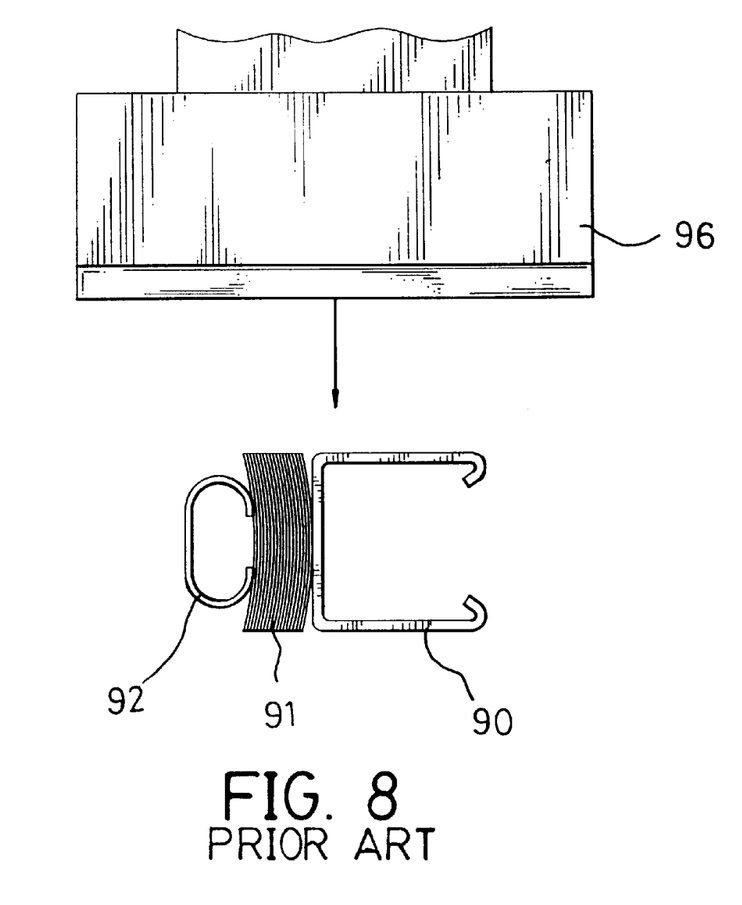
FIG. 8 is a partially cut-away top plan operational view of a conventional cutting-off machine for cutting the Venetian blind.

A conventional cutting-off device for a Venetian blind is shown in FIGS. 7 and 8, and there will be a complete illustration in the detailed description of the preferred embodiments, concerning the conventional cutting-off device.

The present invention has arisen to mitigate and/or obviate the disadvantage of the conventional cutting-off device.

SUMMARY OF THE INVENTION

In accordance with one aspect of the present invention, there is provided a cutting-off machine for a Venetian blind which includes a headrail, a bottom rail and a plurality of juxtaposed slats mounted between the headrail and the bottom rail.

The cutting-off machine comprises a working table including a top wall having a first side and a second side. A fastening device is mounted on the first side of the top wall of the working table and comprises a headrail positioning base fixedly mounted on the first side of the top wall of the working table and containing a first guiding groove adapted for passage of the headrail, a slat positioning base fixedly mounted on the first side of the top wall of the working table and containing a guiding opening adapted for passage of the plurality of juxtaposed slats, and a bottom rail positioning base adjustably fixed on the first side of the top wall of the working table and containing a second guiding groove adapted for passage of the bottom rail.

An elongate cutting blade is slidably mounted on the fastening device and includes a first end face slidably mounted on the headrail positioning base and containing a first slot adapted for passage of the headrail and formed with a first cutting edge abutting the headrail, and includes a second end face slidably mounted on the slat positioning base and the bottom rail positioning base and containing a second slot adapted for passage of the slats and the bottom rail and formed with a second cutting edge abutting one of the slats. A control device is mounted on the second side of the top wall of the working connected with the cutting blade for moving the cutting blade.

Further benefits and advantages of the present invention will become apparent after a careful reading of the detailed description with appropriate reference to the accompanying drawings.

DETAILED DESCRIPTION OF THE PREFERRED EMBODIMENTS

For a better understanding of the present invention, reference is made to FIGS. 7 and 8 for illustrating a conventional cutting-off device for a Venetian blind in accordance with the prior art.

The Venetian blind comprises a headrail 90, a plurality of slats 91, a bottom rail 92 and a lift cord 93 as shown in FIG. 7. It is necessary to cut off a predetermined length of the Venetian blind at two ends thereof so as to suit windows of different sizes. In operation, the lift cord 93 can be moved downwardly to lift the slats 91 such that the headrail 90, the slats 91 and the bottom rail 92 can tightly abut with each other as shown in FIG. 8, thereby folding the Venetian blind into a compact status. The headrail 90, the slats 91 and the bottom rail 92 can then be inserted into and secured by a vice (not shown).

The conventional cutting-off device comprises a cutting blade 96 which can be lowered along a direction as indicated by the arrow shown in FIG. 8 so as to cut-off the headrail 90, the slats 91 and the bottom rail 92. By such an arrangement, however, each of the slats 91 tends to slip due to their smooth surfaces when the cutting blade 96 presses them, thereby easily causing an unstable condition during the cutting process such that the predetermined cutting length of the Venetian blind cannot be controlled precisely.

Referring now to FIGS. 1–4, a cutting-off machine in accordance with the present invention can be adapted for cutting off a Venetian blind which includes a headrail 80, a bottom rail 82 and a plurality of juxtaposed slats 81 mounted between the headrail 80 and the bottom rail 82.

The cutting-off machine comprises a working table 10 including a top wall 11 having a first side and a second side. A fastening device 3 is mounted on the first side of the top wall 11 of the working table 10 and comprises a headrail positioning base 30 fixedly mounted on the first side of the top wall 11 of the working table 10 and containing a first guiding groove 31 whose shape is designed to mate that of the headrail 80 for passage of the headrail 80, a slat positioning base 40 fixedly mounted on the first side of the top wall 11 of the working table 10 and containing a guiding opening 41 adapted for passage of the plurality of juxtaposed slats 81, and a bottom rail positioning base 50 adjustably fixed on the first side of the top wall 11 of the working table 10 and containing a second guiding groove 51 whose shape is designed to mate that of the bottom rail 82 for passage of the bottom rail 82.

A supporting base 70 is located adjacent to the working table 10 and can be moved relative to it. A supporting block 71 is fixedly mounted on the supporting base 70 and contains a first recess 72 for receiving the headrail 80, a second recess 73 for receiving the slats 81, and a third recess 74 for receiving the bottom rail 82.

Two guiding tracks 18 are each fixedly mounted in a space 100 contained in the working table 10, and two sliding bars 181 are each slidably mounted in one of the two corresponding guiding tracks 18 and each includes one end portion fixedly mounted on the supporting base 70 for moving it.

A cutting tool 2 comprises a locking rod 28 mounted in a supporting base 281 fixedly mounted on the second side of the top wall 11 of the working table 10, and an elongate cutting blade 20 connected to the locking rod 28 and slidably mounted on the fastening device 3. A control device 29 is mounted on the supporting base 281 and is connected to the locking rod 28 for moving the locking rod 28 which in turn moves the cutting blade 20. The control device 29 preferably comprises a hydraulic actuating system for moving the cutting tool 2.

The cutting blade 20 includes a first end face 21 slidably mounted on the headrail positioning base 30 and containing a first slot 22 adapted for passage of the headrail 80 and formed with a first cutting edge 23 abutting the headrail 80, and includes a second end face 24 slidably mounted on the slat positioning base 40 and the bottom rail positioning base 50 and containing a second slot 25 adapted for passage of the slats 81 and the bottom rail 82 and formed with a second cutting edge 26 abutting one of the slats 81.

Figure 1:
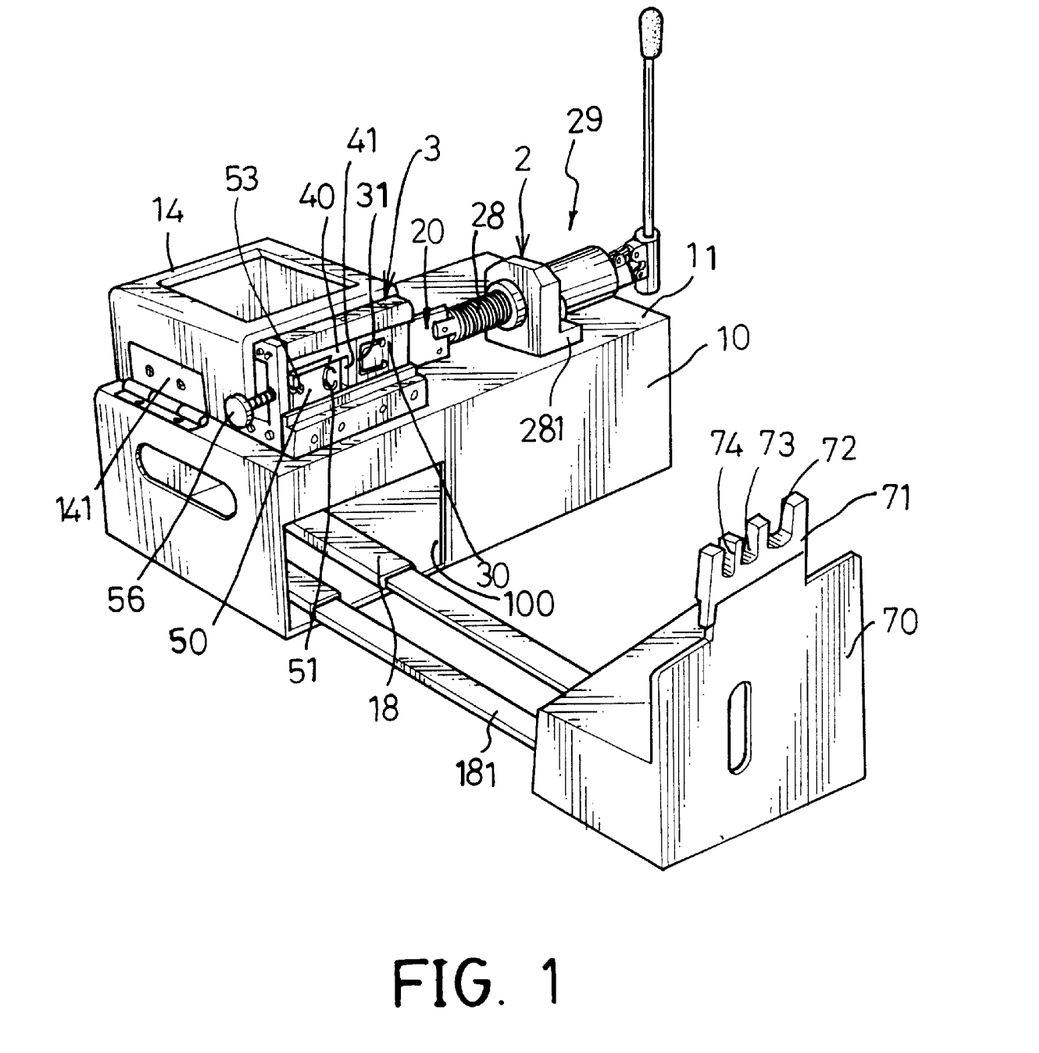
FIG. 1 is a perspective view of a cutting-off machine for a Venetian blind in accordance with the present invention.
Figure 2:
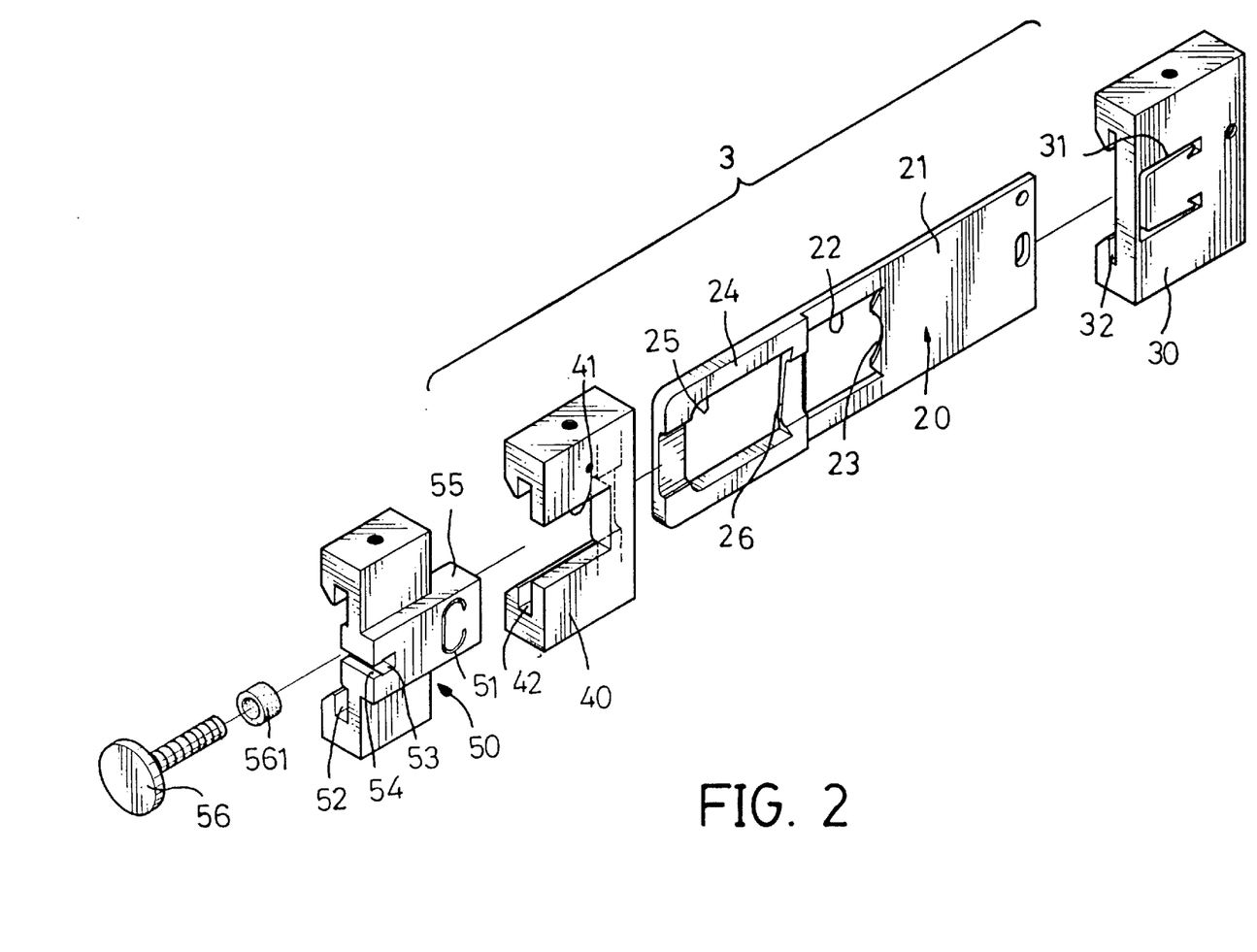
FIG. 2 is an exploded view of a fastening device of the cutting-off machine as shown in FIG. 1.

The headrail positioning base 30 contains a first slide groove 32 for passage of the first end face 21 of the cutting blade 20, the slat positioning base 40 contains a second slide groove 42 for passage of the second end face 24 of the cutting blade 20, and the bottom rail positioning base 50 contains a third slide groove 52 for passage of the second end face 24 of the cutting blade 20.

A base 16 is fixedly mounted on the first side of the top wall 11 of the working table 10 and includes a first end portion and a second end portion, a substantially U-shaped side plate 17 includes a first end portion fixedly mounted on the first end portion of the base 16 and a second end portion, and a top plate 15 is arranged in parallel with the base 16 and includes a first end portion fixedly mounted on the second end portion of the side plate 17.

The headrail positioning base 30 and the slat positioning base 40 are fixedly mounted between the base 16 and the top plate 15, and the bottom rail positioning base 50 is slidably mounted between the base 16 and the top plate 15 and is adjustably movable between the slat positioning base 40 and the side plate 17.

The bottom rail positioning base 50 is formed with a slide 55 comprising a first end portion containing a large cavity 53 and a small cavity 54 and a second end portion slidably received in the guiding opening 41, and the fastening device 3 further comprises a flexible washer 561 securely fitted in the large cavity 53, and a threaded adjusting rod 56 rotatably mounted on the side plate 17 and including one end portion extending through the side plate 17, through the small cavity 54 and securely fitted in the washer 561 such that the slide 55 can be displaced between the slat positioning base 40 and the side plate 17 by means of rotating the threaded adjusting rod 56.

The cutting-off machine further comprises a cutting depth adjusting base 60 slidably mounted on the first side of the top wall 11 of the working table 10, wherein the headrail 80, the slats 81 and the bottom rail 82 can be adapted to abut the adjusting base 60.

The cutting depth adjusting base 60 is substantially inverted L-shaped and includes a horizontal section 61 abutting the headrail 80, the slats 81 and the bottom rail 82 and vertically containing a threaded bore 610, and includes an upright section 62 transversely containing a passage 621 connecting to the threaded bore 610.

The cutting-off machine further comprises two positioning blocks 65 each fixedly mounted on the first side of the top wall 11 of the working table 10, an indicating rod 64 fixedly mounted between the two positioning blocks 65 and extending through the passage 621 such that the cutting depth adjusting base 60 can slide on the indicating rod 64, a guiding channel 641 longitudinally contained in the indicating rod 64 and connecting to the threaded bore 610, a plurality of graduations 642 printed on the indicating rod 64, and an adjusting bolt 631 rotatably mounted on the horizontal section 61 of the cutting depth adjusting base 60 and including one end portion extending through the threaded bore 610 and received in the guiding channel 641.

The top wall 11 of the working table 10 contains a receiving pit 12 located adjacent to the fastening device 3, the working table 10 transversely contains an outlet cavity 13 connecting to the receiving pit 12, and a receiving case 121 is slidably mounted in the receiving pit 12 via the outlet cavity 13 for accumulating cuttings of the headrail 80, the slats 81 and the bottom rail 82 after being cut. A cover 14 is pivotally mounted on the top wall 11 of the working table 10 by means of a hinge 141 for encompassing the receiving pit 12 and cutting depth adjusting base 60.

Figure 3:
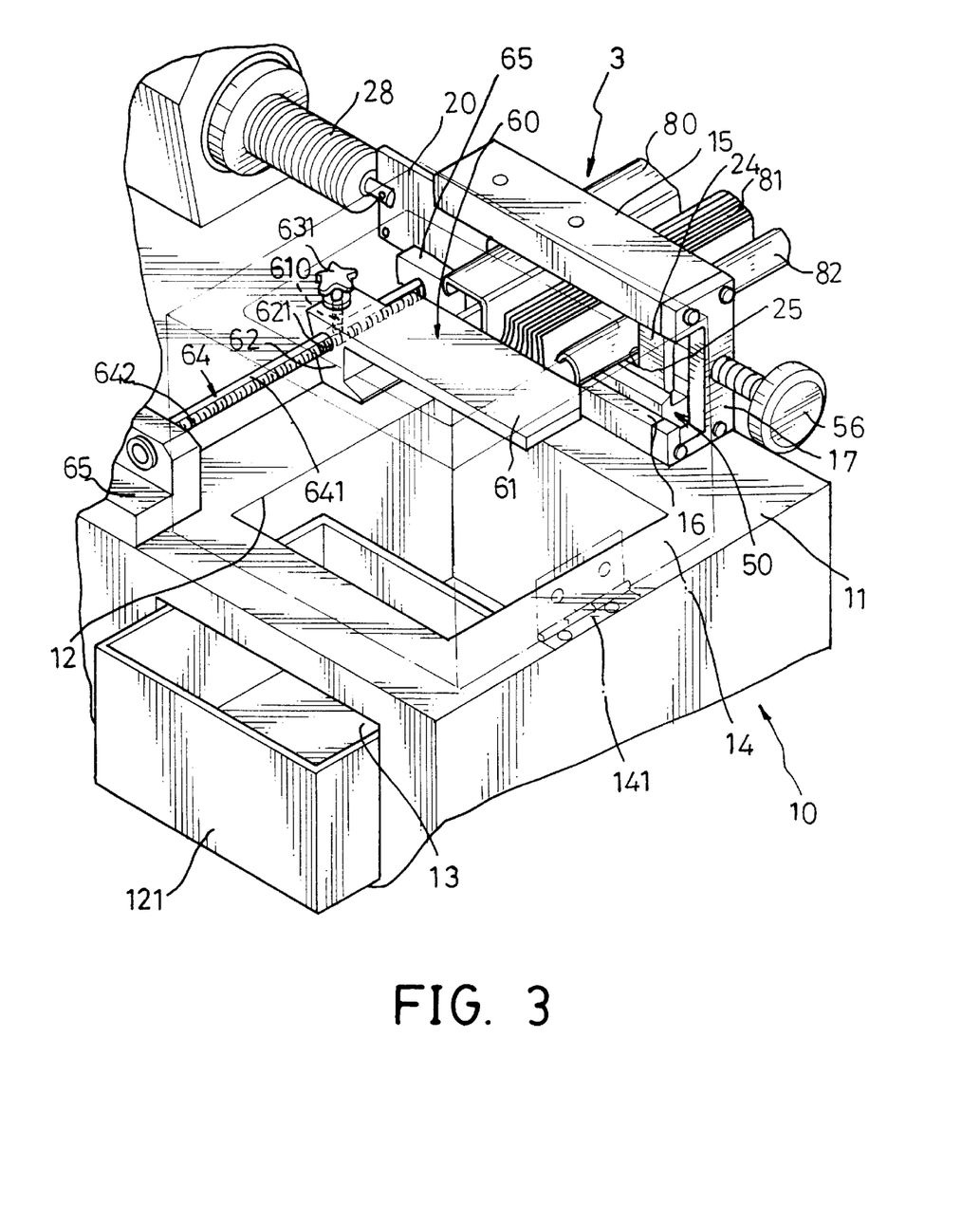
FIG. 3 is a partially cut-away rear perspective view of the cutting-off machine as shown in FIG. 1.
Figure 4:
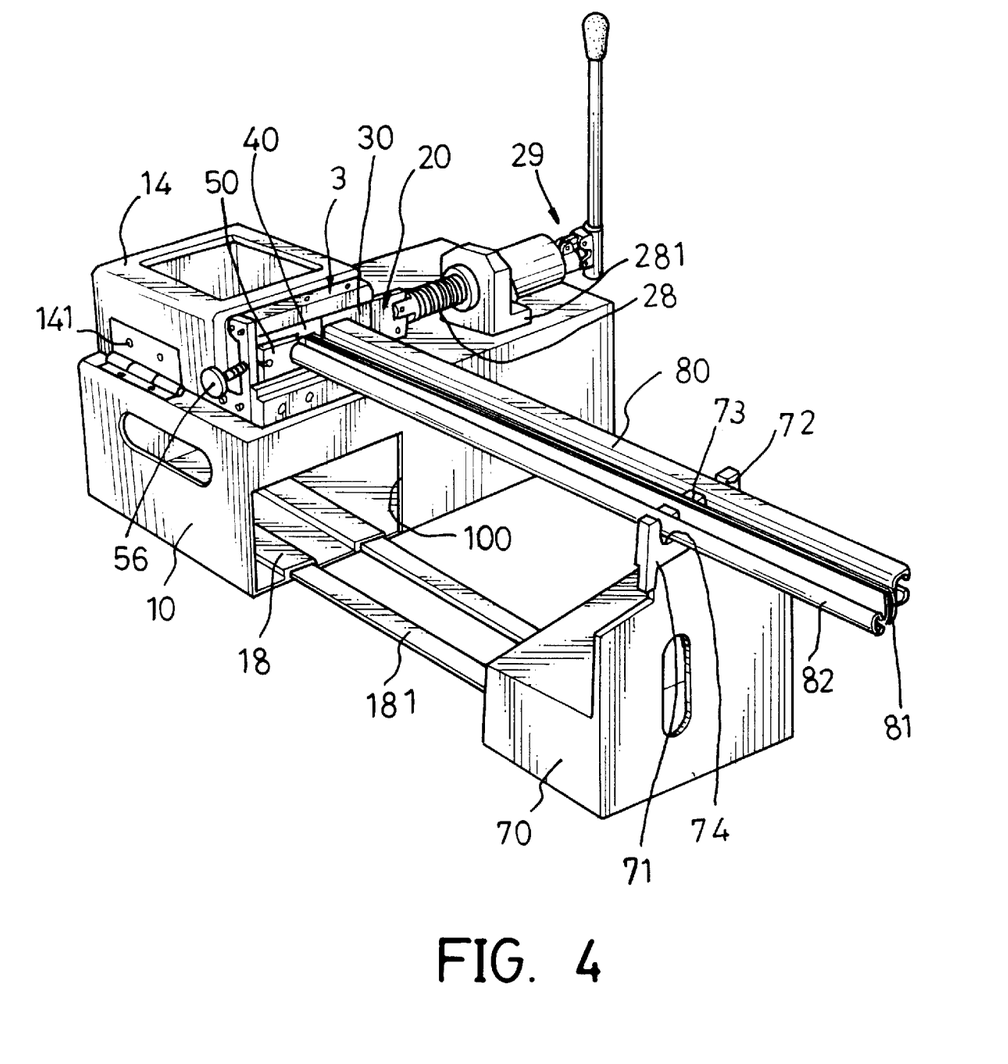
FIG. 4 is an operational view of the cutting-off machine as shown in FIG. 1.
Figure 5:
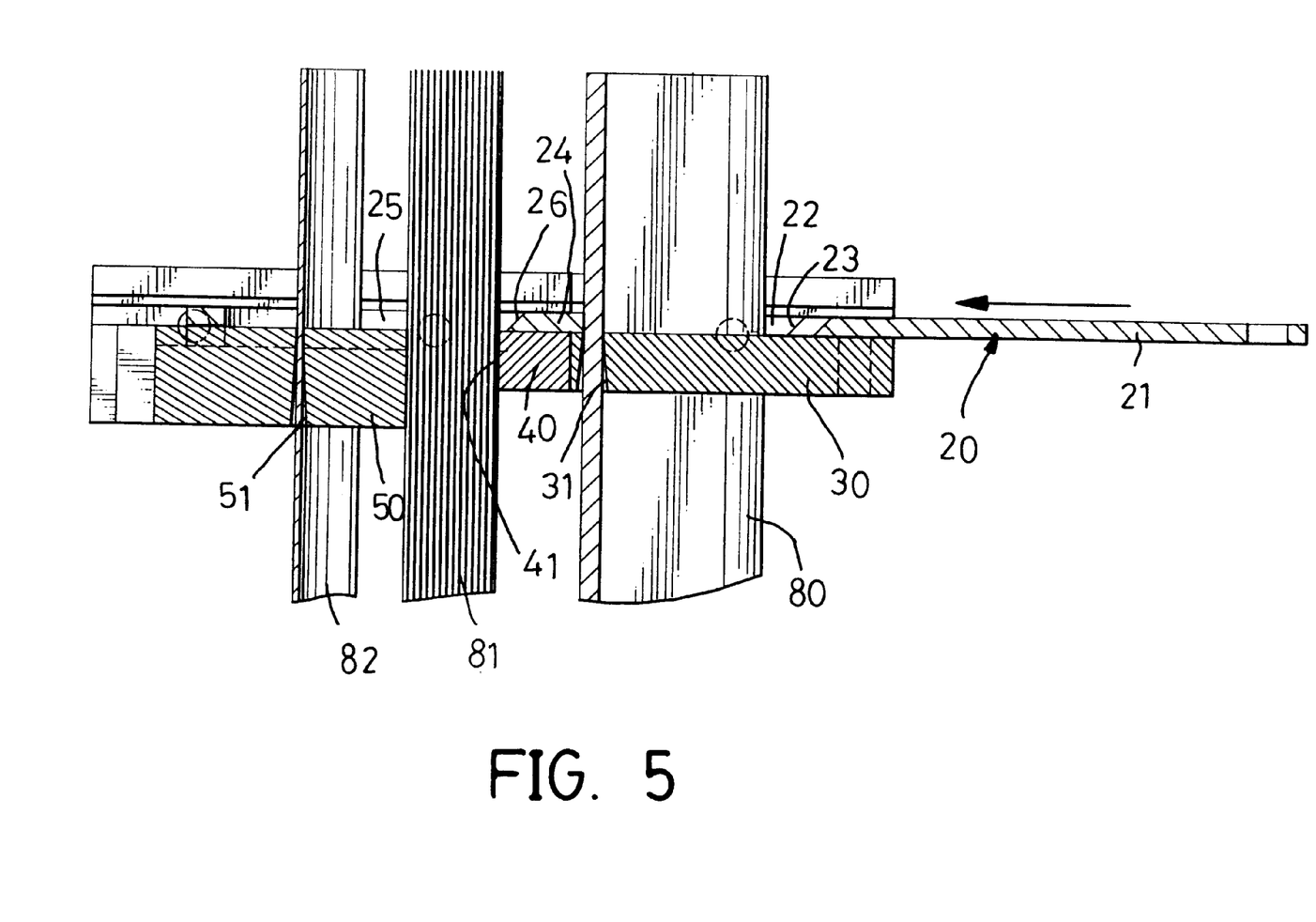
FIG. 5 is a partially cut-away top plan cross-sectional view of the cutting-off machine as shown in FIG. 4.
Figure 6:
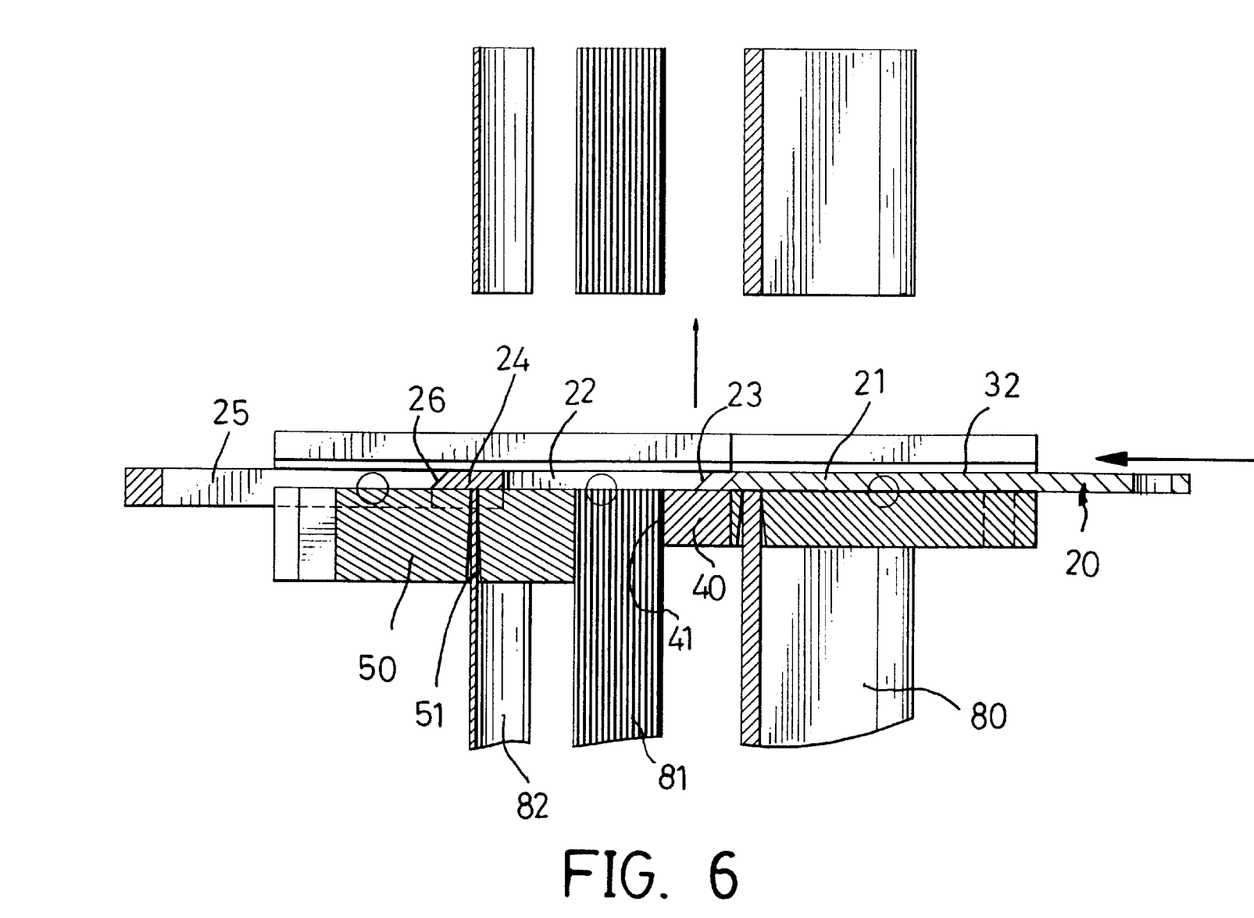
FIG. 6 is an operational view of FIG. 5.

In operation, referring now to FIGS. 5 and 6 with reference to FIGS. 1–4, the cutting depth adjusting base 60 can be moved on the top wall 11 of the working table 10 along the indicating rod 64 whose graduations 642 can be used for indicating the depth to be cut. The adjusting bolt 631 can then be rotated to press the indicating rod 64 so that movement of the cutting depth adjusting base 60 is stopped, thereby fixing the cutting depth adjusting base 60 on the indicating rod 64 as shown in FIG. 3.

The headrail 80, the slats 81 and the bottom rail 82 can then be moved to flush abut the cutting depth adjusting base 60, and the threaded adjusting rod 56 can then be rotated so as to press and move the bottom rail positioning base 50 toward the slat positioning base 40 such that the slide 55 can be moved in the guiding opening 41, thereby tightly compressing the slats 81 to a compact status.

The cutting blade 20 can then be moved by means of the control device 29 along a direction as indicated by the arrow shown in FIG. 5 from a first position as shown in FIG. 5 to a second position as shown in FIG. 6, thereby in turn cutting off the headrail 80 by means of the first cutting edge 23 and cutting off the slats 81 and the bottom rail 82 by means of the second cutting edge 26 such that the Venetian blind can be cut to a predetermined length. The cuttings of the headrail 80, the slats 81 and the bottom rail 82 after the cutting-off process can then fall into the receiving case 121 via the receiving pit 12.

It should be clear to those skilled in the art that further embodiments may be made without departing from the scope and spirit of the present invention.

What is claimed is:

1. A cutting-off machine for a Venetian blind which includes a headrail, a bottom rail and a plurality of juxtaposed slats mounted between said headrail and said bottom rail, and said cutting-off machine comprising:

a working table including a top wall having a first side and a second side; a fastening device mounted on said first side of said top wall of said working table and comprising:

a headrail positioning base fixedly mounted on said first side of said top wall of said working table and containing a first guiding groove adapted for passage of said headrail;

a slat positioning base fixedly mounted on said first side of said top wall of said working table and containing a guiding opening adapted for passage of said plurality of juxtaposed slats;

a bottom rail positioning base adjustably fixed on said first side of said top wall of said working table and containing a second guiding groove adapted for passage of said bottom rail;

a base fixedly mounted on said first side of said top wall of said working table and including a first end portion and a second end portion;

a side plate including a first end portion fixedly mounted on said first end portion of said base and a second end portion; and a top plate disposed in parallel with said base and including a first end portion fixedly mounted on said second end portion of said side plate, wherein said headrail positioning base and said slat positioning base are fixedly mounted between said base and said top plate and said bottom rail positioning base is slidably mounted between said base and said top plate and is adjustably movable between said slat positioning base and said side plate;

an elongate cutting blade slidably mounted on said fastening device and including a first end face slidably mounted on said headrail positioning base and containing a first slot adapted for passage of said headrail and formed with a first cutting edge abutting said headrail, and including a second end face slidably mounted on said slat positioning base and said bottom rail positioning base and containing a second slot adapted for passage of said slats and said bottom rail and formed with a second cutting edge abutting one of said slats; and a control device mounted on said second side of said top wall of said working table and connected with said cutting blade for moving said cutting blade.

2. The cutting-off machine in accordance with claim 1, wherein said headrail positioning base contains a first slide groove for passage of said first end face of said cutting blade, said slat positioning base contains a second slide groove for passage of said second end face of said cutting blade, and said bottom rail positioning base contains a third slide groove for passage of said second end face of said cutting blade.

3. The cutting-off machine in accordance with claim 1, wherein said bottom rail positioning base is formed with a slide including a first end portion containing a large cavity and a small cavity and a second end portion slidably received in said guiding opening, and said fastening device further comprises a flexible washer fitted in said large cavity, and a threaded adjusting rod rotatably mounted on said side plate and including one end portion extending through said side plate and said small cavity and securely fitted in said washer.

4. The cutting-off machine in accordance with claim 1, further comprising a cutting depth adjusting base slidably mounted on said first side of said top wall of said working table, wherein said headrail, said slats and said bottom rail abut said adjusting base.

5. The cutting-off machine in accordance with claim 4, wherein said cutting depth adjusting base is substantially inverted into an L-shape and includes a horizontal section vertically containing a threaded bore, and an upright section transversely containing a passage connecting to said threaded bore, and said cutting-off machine further comprises two positioning blocks, each fixedly mounted on said first side of said top wall of said working table, an indicating rod fixedly mounted between said two positioning blocks and extending through said passage, a guiding channel longitudinally contained in said indicating rod and connecting to said threaded bore, a plurality of graduations printed on said indicating rod, and an adjusting bolt rotatably mounted on said horizontal section of said cutting depth adjusting base and including one end portion extending through said threaded bore and received in said guiding channel.

6. The cutting-off machine in accordance with claim 1, further comprising a supporting base located adjacent said working table, a supporting block fixedly mounted on said supporting base and containing a first recess for receiving said headrail, a second recess for receiving said slats, and a third recess for receiving said bottom rail.

7. The cutting-off machine in accordance with claim 6, further comprising two guiding tracks, each fixedly mounted on said working table, and two sliding bars each slidably mounted in one of corresponding said two guiding tracks and each including one end portion fixedly mounted on said supporting base.

8. The cutting-off machine in accordance with claim 1, wherein said top wall of said working table contains a receiving pit located adjacent said fastening device, said working table transversely contains an outlet cavity connecting to said receiving pit, and said cutting-off machine further comprises a receiving case slidably received in said receiving pit.

9. The cutting-off machine in accordance with claim 8, further comprising a cover pivotally mounted on said top wall of said working table for encompassing said receiving said receiving pit.

* * * * *